US010683187B2

(12) United States Patent
Hawkins

(10) Patent No.: US 10,683,187 B2
(45) Date of Patent: Jun. 16, 2020

(54) MOBILE ELECTRICAL CABLE DISTRIBUTION ASSEMBLY

(71) Applicant: Cole Darren Hawkins, Eagles River, AK (US)

(72) Inventor: Cole Darren Hawkins, Eagles River, AK (US)

(*) Notice: Subject to any disclaimer, the term of this patent is extended or adjusted under 35 U.S.C. 154(b) by 0 days.

(21) Appl. No.: 16/186,452

(22) Filed: Nov. 9, 2018

(65) Prior Publication Data
US 2019/0185288 A1 Jun. 20, 2019

Related U.S. Application Data

(60) Provisional application No. 62/708,657, filed on Dec. 18, 2017.

(51) Int. Cl.
*B65H 49/32* (2006.01)
*B62B 3/00* (2006.01)

(52) U.S. Cl.
CPC .......... *B65H 49/325* (2013.01); *B62B 3/006* (2013.01); *B62B 2202/025* (2013.01); *B65H 2701/34* (2013.01)

(58) Field of Classification Search
CPC .. B65H 49/32; B65H 49/325; B65H 2701/34; B62B 3/006; B62B 2202/025; B62B 3/008; B62B 3/104; B62B 1/22
See application file for complete search history.

(56) References Cited

U.S. PATENT DOCUMENTS

| | | | |
|---|---|---|---|
| 2,981,496 A * | 4/1961 | Harmon ................. | B65H 49/36 242/129.8 |
| 3,856,230 A * | 12/1974 | Zimmer ................... | B62B 1/22 242/422.8 |
| 4,391,422 A * | 7/1983 | McDonald ............. | B62B 1/264 242/129.6 |
| 5,285,981 A | 2/1994 | Pavelka | |
| 5,687,928 A * | 11/1997 | Lassiter ................. | B65H 49/24 242/129.5 |
| 6,270,094 B1 | 8/2001 | Campbell | |
| 6,422,504 B1 * | 7/2002 | Elder ..................... | B65H 49/32 211/85.5 |
| 6,834,827 B2 * | 12/2004 | Burkitt ................... | B65H 49/32 242/557 |

(Continued)

*Primary Examiner* — William A. Rivera
(74) *Attorney, Agent, or Firm* — Jerry Haynes Law

(57) ABSTRACT

A mobile electrical cable distribution assembly provides a mobile cart that supports multiple spools at a slope, creating a tiered arrangement of spools for easier access and distribution of the electrical cables rolled thereon. The mobility of the cart enables the electrical cables to be positioned for drawing and spooling. The sloped arrangement of the spools allows for facilitated access to the ends of the electrical cable for drawing and spooling the electrical cable. The spools are configured to carry, draw, and spool the electrical cables directly from the cart. The assembly also provides multiple interchangeable conveyor rollers to carry the spools. The conveyor rollers comprise a shaft, antifriction ball bearings, and an outer cylinder race for drawing and spooling the electrical cable about the spool. The conveyor roller also has springs between the outer cylinder race and the shaft, creating spring returned mounting for facilitated access to the ball bearings.

18 Claims, 5 Drawing Sheets

(56) References Cited

U.S. PATENT DOCUMENTS

| | | | | |
|---|---|---|---|---|
| 7,481,394 B2 * | 1/2009 | Gleason | ................ | B65H 49/32 |
| | | | | 242/588 |
| 7,784,729 B1 * | 8/2010 | Hope | .................... | B65H 49/32 |
| | | | | 242/557 |
| 7,931,227 B1 * | 4/2011 | Oudekerk | .............. | B65H 49/32 |
| | | | | 242/403.1 |
| 8,172,170 B2 * | 5/2012 | Vaughan | ................ | B65H 49/16 |
| | | | | 242/131 |
| 8,371,518 B2 * | 2/2013 | Factor | ...................... | B62B 1/20 |
| | | | | 242/557 |
| 2001/0030257 A1 * | 10/2001 | Fletcher | ................ | B65H 57/16 |
| | | | | 242/557 |

\* cited by examiner

MOBILE ELECTRICAL CABLE DISTRIBUTION ASSEMBLY

CROSS-REFERENCE TO RELATED APPLICATIONS

This application claims the benefits of U.S. provisional application No. 62/708,657, filed Dec. 18, 2017 and entitled SPEED CABLE CART, which provisional application is incorporated by reference herein in its entirety.

FIELD OF THE INVENTION

The present invention relates generally to a mobile electrical cable distribution assembly. More so, the present invention relates to a cable distribution assembly provides a mobile cart that supports multiple spools at a slope, creating a tiered arrangement of spools for easier access and distribution of the electrical cables rolled thereon; whereby the spools are configured to carry, draw, and spool the electrical cables directly from the cart; and whereby multiple interchangeable conveyor rollers include antifriction ball bearings for facilitated rolling of the spools.

BACKGROUND OF THE INVENTION

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon.

Often, installing electrical wiring and cable is performed with a spool of cable or wire. The ends of the cable are drawn out by hand or mechanism, and spooled back onto the spool through rotation of the spool. Such distribution of cables into structures can cause entanglements or misalignment problems however. For example, electrical wiring is often provided from the manufacturer in the form of a wound coil, with a simple plastic wrapping. The electrician installing the wire into the building or structure is required to remove the plastic wrapping and pull an end of the wire to begin installation. This can result in the coil itself being pulled with the wire such that it is not readily distributed. Many cables overcome this by having an elevated axle about which the spool of cable rotates. The rotation of the spool is about a bearing mechanism that can support the load.

In a typical bearing mechanism, a pinion shaft is rotatably supported by a single ball bearing in the front wall of the body of a spinning reel. This may encompass a ball bearing conveyor. The ball bearing is a type of rolling-element bearing that uses spherical members to maintain the separation between the bearing races. The ball bearing reduces rotational friction while supporting a radial and axial load on the spool of cable. Because the balls are rolling they have a much lower coefficient of friction than if two flat surfaces were sliding against each other.

Other proposals have involved cable and wire distribution systems. The problem with these distribution systems is that they do not support the weight of the spool and cable sufficiently to enable a smooth, easy drawing pout and spooling in of the cable. Also, the spool is not rotatable or easily advanced, because it is resting on a stationary axle. Even though the above cited cable and wire distribution systems meet some of the needs of the market, a mobile electrical cable distribution assembly that supports multiple spools at a slope, creating a tiered arrangement of spools for easier access and distribution of the electrical cables rolled thereon; whereby the spools are configured to carry, draw, and spool the electrical cables directly from the cart; and whereby multiple interchangeable conveyor rollers include antifriction ball bearings for facilitated rolling of the spools, is still desired.

Summary

Illustrative embodiments of the disclosure are generally directed to a mobile electrical cable distribution assembly. The electrical cable distribution assembly provides a mobile cart that supports multiple spools at a slope, creating a tiered arrangement of spools supported by conveyor rollers for easier access and distribution of the electrical cables rolled thereon. The mobility of the cart enables the electrical cables to be positioned for drawing and spooling. The sloped arrangement of the spools allows for facilitated access to the ends of the electrical cable for drawing and spooling the electrical cable. The spools are configured to carry, draw, and spool the electrical cables directly from the cart. The assembly also provides multiple interchangeable conveyor rollers to carry the spools. The conveyor rollers comprise a shaft, antifriction ball bearings, and an outer cylinder race for drawing and spooling the electrical cable about the spool. The conveyor roller also has springs between the outer cylinder race and the shaft, creating spring returned mounting for facilitating access to the ball bearings.

In one aspect, the mobile electrical cable distribution assembly, comprises a cart comprising a base platform, at least one long support leg, at least one short support leg, at least one spool support bar disposed at a slope between the long and short support legs, the spool support bar forming a plurality of spaced-apart slots.

The mobile electrical cable distribution assembly further comprises at least one wheel joined to the base platform.

The mobile electrical cable distribution assembly further comprises multiple interchangeable conveyor rollers interchangeably fitted into any one of the slots, the conveyor rollers comprising a shaft, a plurality of antifriction ball bearings, and an outer cylinder race, whereby the conveyor rollers rotate freely in the slots.

The mobile electrical cable distribution assembly further comprises multiple spools concentrically rotatable about the conveyor rollers, whereby the spools are disposed at a slope along the length of the cart, the spools being operable to enable carrying a plurality of cables, whereby the spools draw and spool the cables.

In another aspect, the assembly further comprises a bracket.

In another aspect, the bracket joins with the long or short support legs.

In another aspect, the bracket retains at least one of the conveyor rollers.

In another aspect, the long support leg is longer than the short support leg.

In another aspect, the at least one wheel comprises six castor wheels having a diameter of six inches.

In another aspect, the cart further comprises at least one lateral support bar, the lateral support bar connecting the short support legs.

In another aspect, the cart is fabricated from tubular constructed steel.

In another aspect, the multiple spools comprises ten spools.

In another aspect, the conveyor rollers comprise a spring disposed between the outer cylinder race and the shaft.

In another aspect, the spring enables spring returned mounting for facilitated access to the ball bearings.

In another aspect, the conveyor rollers comprise a polyurethane or vinyl coating.

In another aspect, the ball bearings comprise high speed ABEC ball bearings.

One objective of the present invention is to provide frictionless drawing and spooling of electrical cables from a mobile cart.

Another objective is to roll the spools to a desired position through use of castor wheels.

Yet another objective is to reposition the conveyor rollers and spools along the length of the spool support bar.

Yet another objective is to load the spools on the sloped spool support bars, so as to achieve a tiered cable distribution arrangement.

Yet another objective is to create a tiered arrangement of spools, which allows for greater clearance when drawing out or spooling in cables.

Yet another objective is to enhance electrical cable guidance, organization and storage.

Yet another objective is to enable quiet operation, easy installation, moderate maintenance, and low expense for distributing electrical cables.

Yet another objective is to provide an easy to use cable distribution assembly that requires minimal training or tools.

Other systems, devices, methods, features, and advantages will be or become apparent to one with skill in the art upon examination of the following drawings and detailed description. It is intended that all such additional systems, methods, features, and advantages be included within this description, be within the scope of the present disclosure, and be protected by the accompanying claims and drawings.

BRIEF DESCRIPTION OF THE DRAWINGS

The invention will now be described, by way of example, with reference to the accompanying drawings, in which.

Like reference numerals refer to like parts throughout the various views of the drawings.

DETAILED DESCRIPTION OF THE INVENTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper," "lower," "left," "rear," "right," "front," "vertical," "horizontal," and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Specific dimensions and other physical characteristics relating to the embodiments disclosed herein are therefore not to be considered as limiting, unless the claims expressly state otherwise.

A mobile electrical cable distribution assembly 100 is referenced in FIGS. 1-7. The mobile electrical cable distribution assembly 100, hereafter "assembly 100" is a novel mechanism useful laying out and spooling in electrical cables, fiberglass cables, and general power distribution cables and wires known in the art. Assembly 100 is configured to enhance electrical cable guidance, organization and storage through use of moveable, tiered, free-rolling spools 122a-e that rotate about frictionless ball bearings, and a mobile cart that facilitates positioning and advancement of the spools 122a-e.

Figure 1:
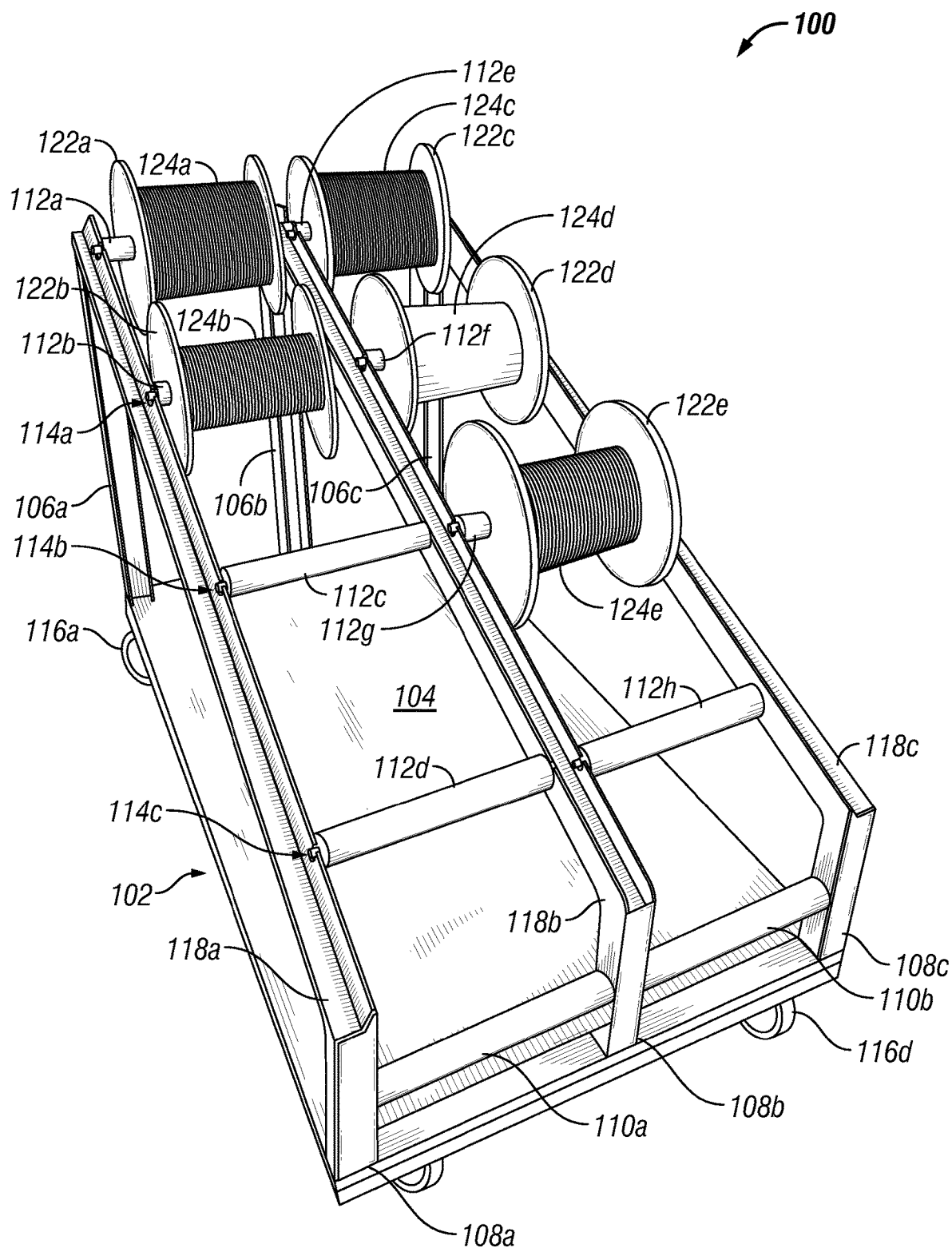
FIG. 1 illustrates a perspective view of an exemplary mobile electrical cable distribution assembly, in accordance with an embodiment of the present invention.

As shown in FIG. 1, the assembly 100 provides a mobile cart 102 that supports multiple spools 122a-e at a slope, creating a tiered arrangement of spools 122a-e. The spools 122a-e are supported by multiple interchangeable conveyor rollers 112a-i that allow the spools 122a-e to roll more freely for easier access and distribution of the electrical cables 124a-e that are being rolled thereon. The positional interchangeability and sloped disposition of the conveyor rollers 112a-i and spools 122a-e positioned along the length of the cart 102 facilitates the distribution of electrical cables 124a-e directly from the cart 102.

Figure 2:
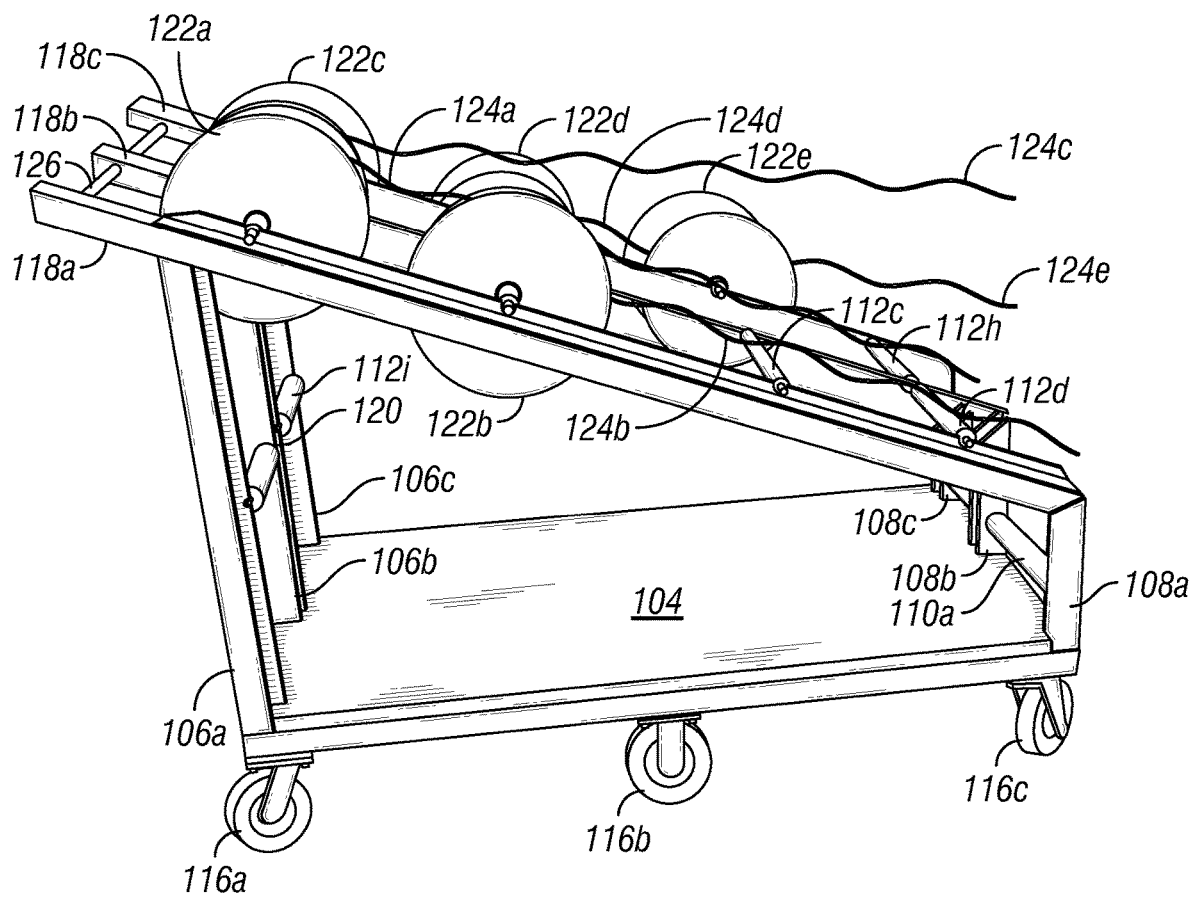
FIG. 2 illustrates an elevated side view of an exemplary mobile electrical cable distribution assembly, in accordance with an embodiment of the present invention.

As referenced in FIG. 2, the assembly 100 comprises a cart 102 that is used to carry the spools 122a-e for distribution of electrical cables 124a-e. The cart 102 comprises a base platform 104 that runs parallel to the ground surface. The cart 102 further comprises at least one long support leg 106a-c and at least one short support leg 108a-c that extend perpendicularly from the base platform 104. The long support leg 106a-c is longer than the short support leg 108a-c. In one non-limiting embodiment, the short support leg 108a-c is 14" long, and the long support leg 106a-c is 38" long. Though, the cart is scalable, such that the lengths can be adjusted to accommodate different cable distribution needs. In one alternative embodiment, the support legs 106a-c, 108a-c are telescopically length-adjustable.

Figure 3:
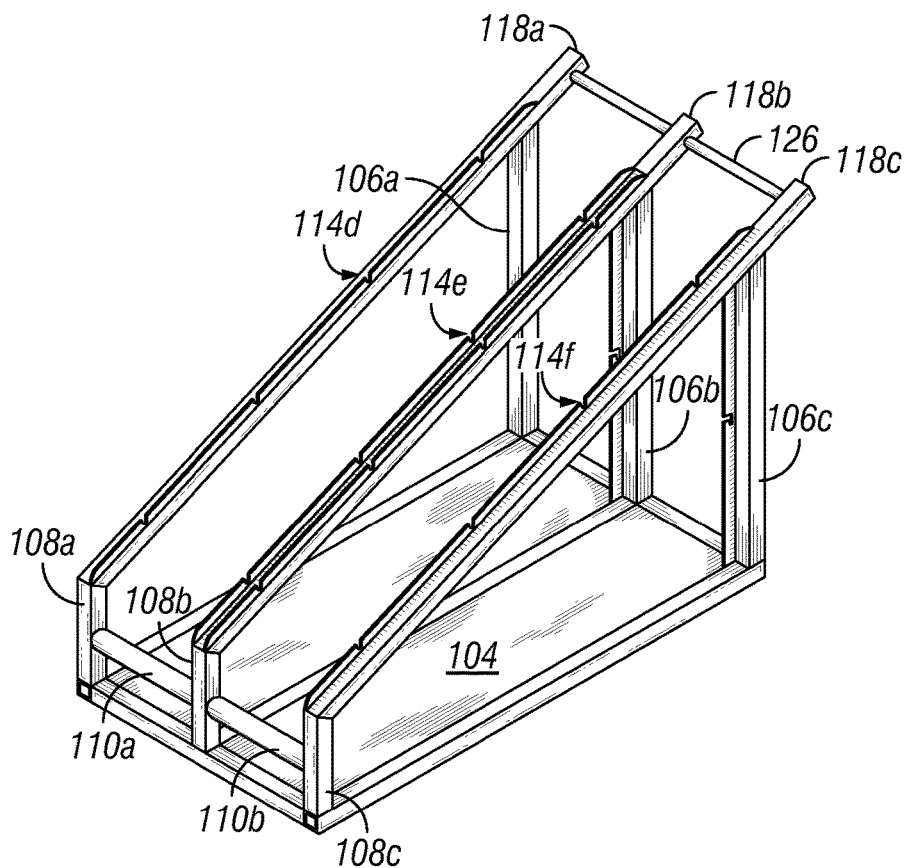
FIG. 3 illustrates a perspective view of an exemplary cart, showing the short and long support legs and spool support bar, in accordance with an embodiment of the present invention.
Figures 4, 5:
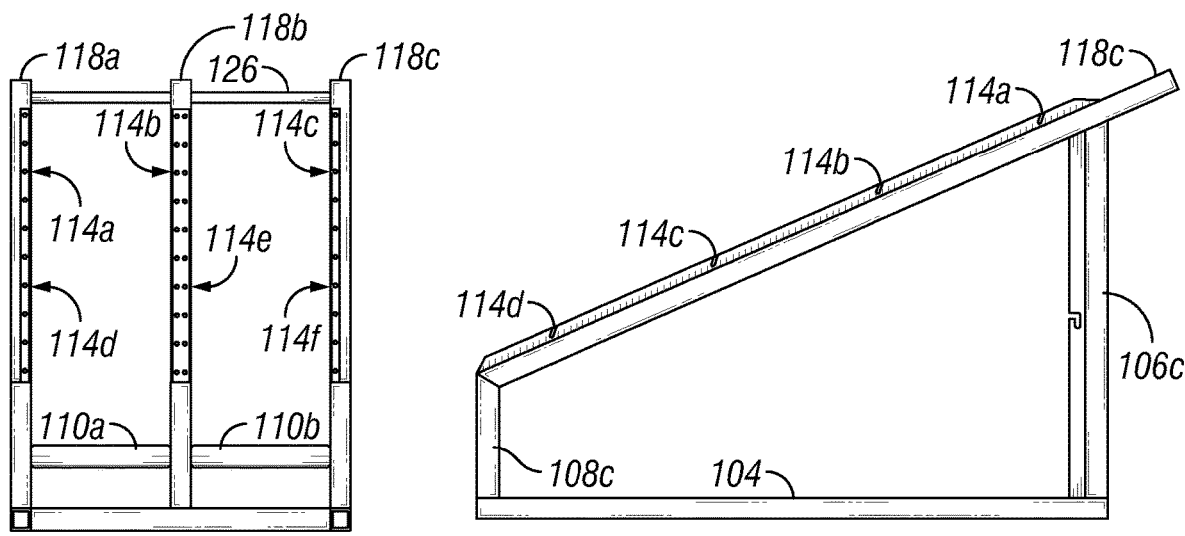
FIG. 4 illustrates a top view of the cart shown in FIG. 3, in accordance with an embodiment of the present invention.
FIG. 5 illustrates an elevated side view of the cart shown in FIG. 3, in accordance with an embodiment of the present invention.

Looking now at FIG. 3, the cart 102 may further include at least one lateral support bar 110a, 110b that extends across the short support leg 108a-c, or the long support leg 106a-c, or both. The lateral support bar 110a-b enhances the structural integrity of the cart 102. This enhanced support may be useful when drawing out or spooling in the electrical cables 124*a-e* from multiple large spools 122*a-e*. Further, as FIG. 4 shows, the cart 102 comprises a handle bar 126 extending between the long leg supports. The handle bar 126 is operable to be gripped for advancing, rotating, and positioning the cart 102 for loading/unloading the spools 122*a-e* and distribution of cables 124*a-e*.

As FIG. 5 shows, the cart 102 further includes at least one spool support bar 118*a-c* that is disposed at a slope between the long and short support legs 106*a-c*, 108*a-c*. The spool support bar 118*a-c* forms a plurality of spaced-apart slots 114*a-f* that are sized and dimensioned to supporting conveyor rollers 112*a-i*, as discussed below. In one embodiment, three spool support bars 118*a*, 118*b*, 118*c* run parallel and coplanar between the long and short support legs 106*a-c*, 108*a-c*. This tri-spool support bar configuration creates two rows of spools 122*a-e* in which up to five spools 122*a-e* are operational in two adjacent rows, as discussed below. Suitable materials for the cart 102 may include, without limitation, tubular constructed steel, aluminum, titanium, and metal alloys.

In one non-limiting embodiment, the cart 102 comprises at least one wheel 116*a-d* that is joined to the bottom side of the base platform 104. The wheel 116*a-d* allows the cart 102 to be pushed into position, rotated, and advanced, so as to enable more precise distribution of the electrical cables 124*a-e*. For example, the wheel 116*a-d* is rotatable up to 360° to allow the cart 102 to be advanced forward, rearward, laterally, or rotated up to 360°. In one non-limiting embodiment, the at least one wheel 116*a-d* comprises six castor wheels having a diameter of 6". Though in other embodiments, the wheel 116*a-d* may have a different structural design or different dimensions.

Figure 6:
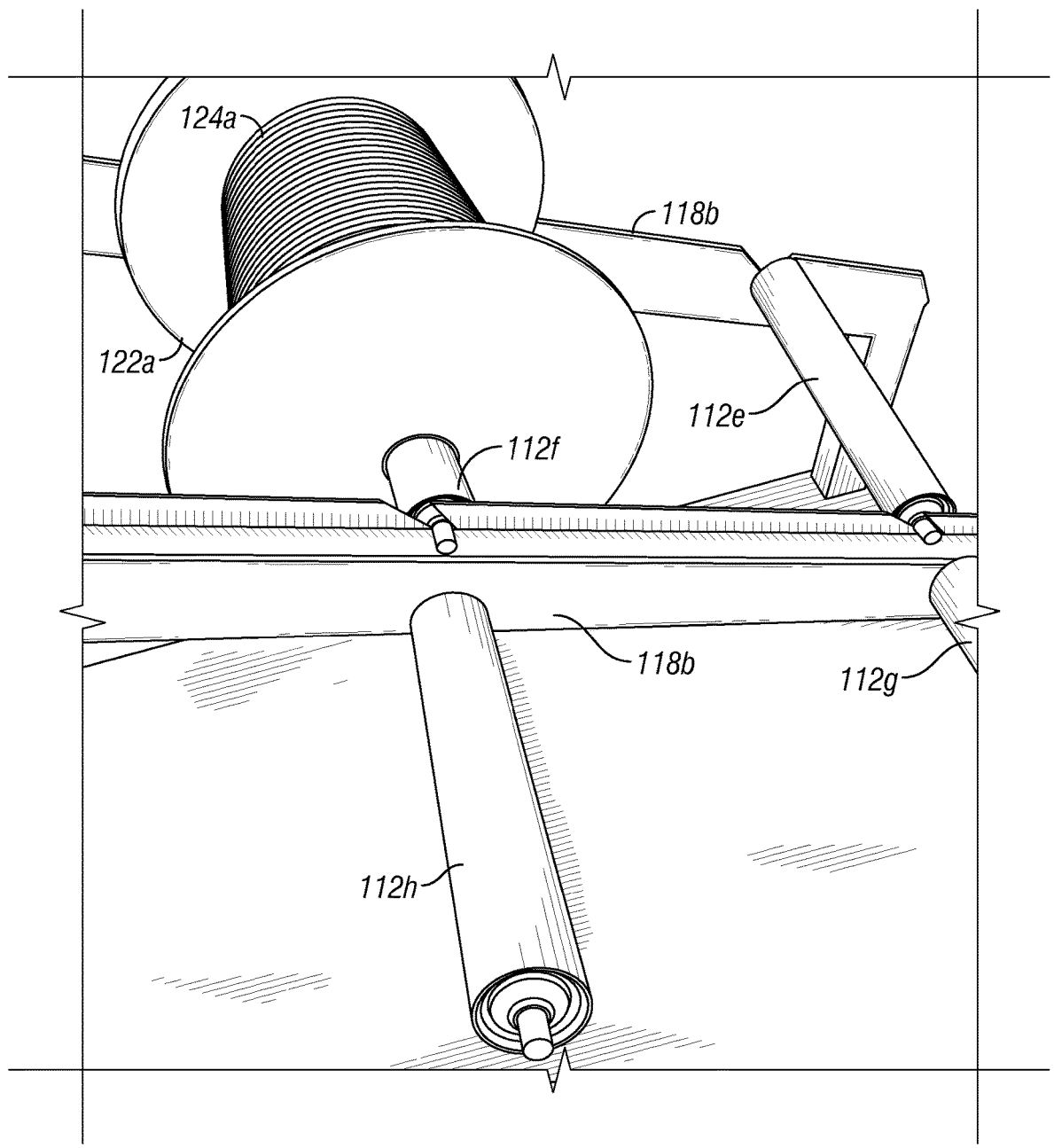
FIG. 6 illustrates a perspective view of an exemplary conveyor roller fitted into a slot in the spool support bar, in accordance with an embodiment of the present invention.

Looking now at FIG. 6, the assembly 100 comprises multiple interchangeable conveyor rollers 112*a-i*. The conveyor rollers 112*a-i* are elongated and configured with races, ball bearings, and a shaft that support the weight of the spool while rotating the spool freely. The conveyor rollers 112*a-i* are also uniquely configured to interchangeably fit into any one of the slots 114*a-f* that form in the spool support bar 118*a-c*. In one non-limiting embodiment, the slots are plug weld holes on the formed part to weld to the spool support bar 118*a-c*, or square tube. The plug weld holes are effective for catching and retaining the conveyor rollers 112*a-i*.

The ends of the conveyor rollers 112*a-i* fit into adjacent slots 114*a-f*, enabling the conveyor roller to rotate freely therein. This fit may be a friction fit coupling between the ends of the conveyor rollers 112*a-i* and the slots, or a fastener may secure the ends of the conveyor rollers 112*a-h* into the slots 114*a-f*.

Those skilled in the art will recognize that different numbers and sizes of spools 122*a-e* and cables 124*a-e* may be used, depending on the type of cable distribution project. This can require conveyor rollers that match the dimensions of the spools. Thus, the assembly 100 provides stowage means for extra conveyor rollers 112*a-i*. In one embodiment, the cart 102 provides a bracket 120 that joins with the long or short support leg 108*a-cs*. The bracket 120 retains at least one of the conveyor rollers 112*i* directly on the cart 102 for stowage. The bracket 120 provides storage space on the cart 102 for the additional conveyor rollers 112*i* when not operational across the spool support bar 118*a-c*.

Figure 7:
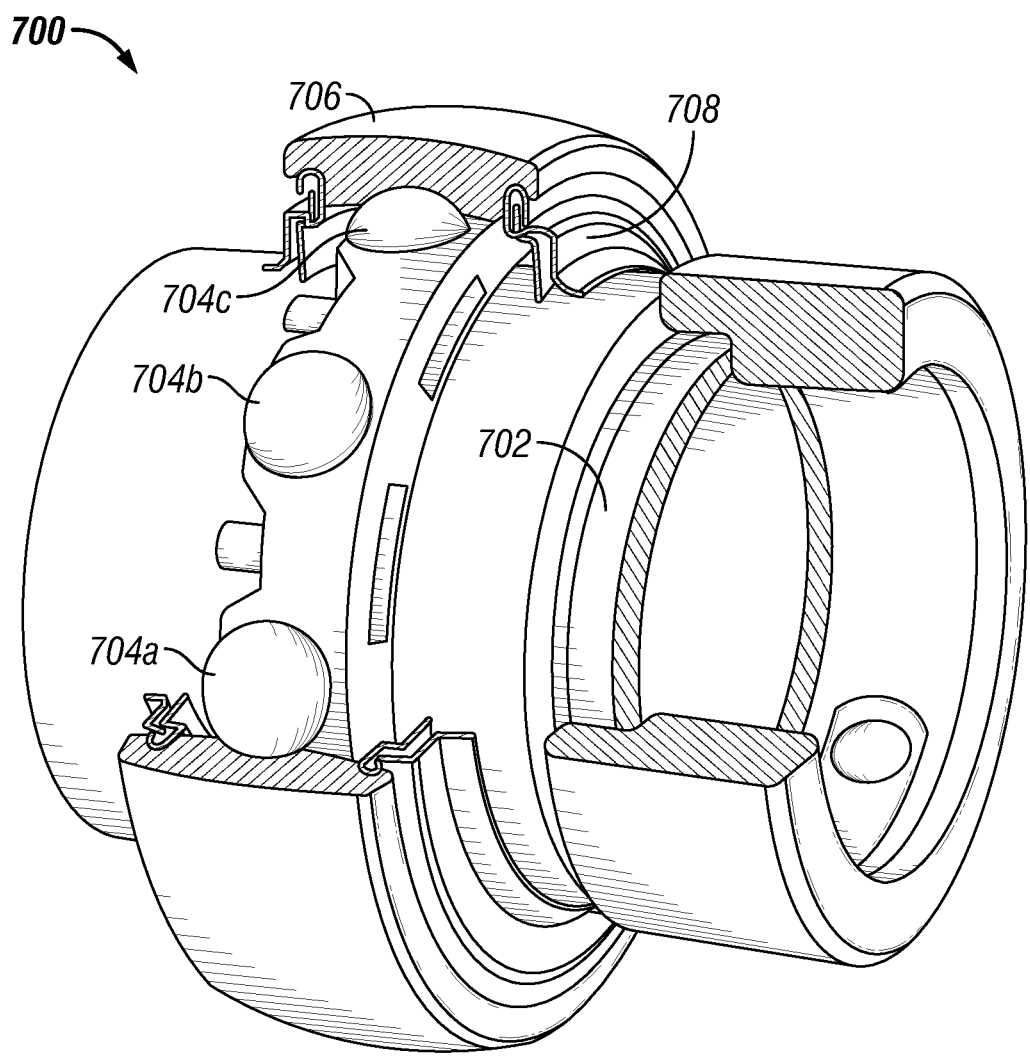
FIG. 7 illustrates a sectioned view of an exemplary conveyor roller having a shaft, ball bearings, and outer race, in accordance with an embodiment of the present invention.

FIG. 7 references one possible embodiment of a low-friction conveyor roller 700 that is used to carry the spools and cables. In this configuration, conveyor roller 700 comprises a shaft 702, a plurality of antifriction ball bearings 704*a*, 704*b*, 704*c*, and an outer cylinder race 706. The shaft 702 runs concentrically through the ball bearings 704*a-c*, while the outer cylinder race 706 encapsulates the ball bearings 704*a-c*. The ball bearings 704*a-c* may be packed with grease in a cylinder rod. The purpose of a ball bearing is to reduce rotational friction and support radial and axial loads from the weight of spools and cables carried thereon.

In another embodiment of the conveyor roller 700, a spring 708 is disposed between the outer cylinder race 706 and the shaft 702. The spring 708 creates a spring returned mounting configuration that allows the ball bearings 704*a-c* to be removed from the outer cylinder race 706 for replacement or maintenance. In one non-limiting embodiment, the ball bearings 704*a-c* comprise high speed ABEC ball bearings. Though in other embodiments, other types of bearings may be used, such as roller bearings. In yet another embodiment, the conveyor roller 700 has a diameter between 1" and $^{29}/_{32}$". In other embodiments, the conveyor roller 700 is coated with a polyurethane or vinyl composition. Suitable materials for the conveyor roller 700 may include, without limitation, steel, galvanized steel, PVC, stainless steel, and aluminum.

Looking back at FIG. 1, the assembly 100 also provides multiple spools 122*a-e* that are configured to concentrically rotate about the conveyor rollers 112*a-i*. The spools 122*a-e* are operable to carry a plurality of cables 124*a-e* for drawing out and spooling in the cables 124*a-e*. The spools 122*a-e* may form a central hole that enables passage of the conveyor rollers 112*a-i*, whereby a snug, yet rotatable relationship exists between the spool and the conveyor roller.

Because of the sloped disposition of the spool support bars 118*a-c*, the spools 122*a-e* are arranged at a slope along the length of the cart 102. This creates a tiered arrangement of spools, which allows for greater clearance when drawing out or spooling in cables. Also, because the conveyor rollers 112*a-i* can be moved between different slots along the spool support bar, the spools 122*a-e* can be moved to a desired position along the length of the cart 102 for drawing out and spooling in the electrical cables 124*a-e*. In one non-limiting embodiment, the multiple spools 122*a-e* comprises ten spools, with five spools arranged on two adjacent rows of spool support bars.

In operation, a plurality of spools 122*a-e* carrying electrical cables 124*a-e* are provided for distributing electrical cables 124*a-e*, fiberglass wires, or other cable member known in the art. The spools 122*a-e* are rotatable about a conveyor roller 112*a-i* for drawing out and spooling in the electrical cables 124*a-e*. This is possible because the conveyor rollers 112*a-i* passes through a central hole in the spool. The conveyor roller and spool are loaded onto a mobile cart 102 by fitting the ends of the conveyor roller into a corresponding sloped spool support bar on the cart 102. This creates a snug, yet rotatable relationship between the spool and the conveyor roller.

Thus, the conveyor roller is lifted onto the spool support bar and the ends of the conveyor roller are fitted into two parallel slots therein. In this configuration, the spools 122*a-e* are disposed at a slope along the length of the cart 102, and also rotatable up to 360°. The rotation can be manual, by hand; or through electrical means, such as a small electrical motor that rotates the conveyor roller and/or spool. In either case, the frictionless ball bearings allow the spool to rotate freely.

After loading the first spool 122*a*, at least one subsequent spool 122*b-e* is loaded onto the spool support bar 118*a-c* in the same manner. Because the spool support bar 118*a-c* is sloped, any one of the spools 122*a* are elevated at a different height than the other spools 122*b-e*. This tiered configuration allows for easier drawing out and spooling in of the electrical cables 124a-e. The cart 102 rolls on at least one wheel 116a-d to position for spooling in and drawing out cables 124a-e from the spools 122a-e.

These and other advantages of the invention will be further understood and appreciated by those skilled in the art by reference to the following written specification, claims and appended drawings.

Because many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalence.

What is claimed is:

1. A mobile electrical cable distribution assembly, the assembly comprising:
    a cart comprising a base platform, at least one long support leg, at least one short support leg, at least one spool support bar disposed at a slope between the long and short support legs, the spool support bar forming a plurality of spaced-apart slots;
    at least one wheel joined to the base platform;
    multiple interchangeable conveyor rollers interchangeably fitted into any one of the slots, the conveyor rollers comprising a shaft, a plurality of antifriction ball bearings, an outer cylinder race, and a spring disposed between the outer cylinder race and the shaft, whereby the conveyor rollers rotate freely in the slots; and
    multiple spools concentrically rotatable about the conveyor rollers, whereby the spools are disposed at a slope along the length of the cart, the spools being operable to enable carrying a plurality of cables, whereby the spools draw and spool the cables.

2. The assembly of claim 1, further comprising a bracket.

3. The assembly of claim 2, wherein the bracket joins with the long support leg or the short support leg.

4. The assembly of claim 3, wherein the bracket retains at least one of the conveyor rollers.

5. The assembly of claim 1, wherein the long support leg is longer than the short support leg.

6. The assembly of claim 1, wherein the at least one wheel comprises six castor wheels having a diameter of six inches.

7. The assembly of claim 1, wherein the cart comprises at least one lateral support bar, and at least two short support legs, the lateral support bar connecting the at least two short support legs to each other.

8. The assembly of claim 1, wherein the cart is fabricated from tubular constructed steel.

9. The assembly of claim 1, wherein the multiple spools comprises ten spools.

10. The assembly of claim 1, wherein the spring enables spring returned mounting for facilitated access to the ball bearings.

11. The assembly of claim 1, wherein the conveyor rollers comprise a polyurethane or vinyl coating.

12. The assembly of claim 1, wherein the ball bearings comprise high speed ABEC ball bearings.

13. The assembly of claim 1, further comprising a handle bar extending between the long leg supports.

14. A mobile electrical cable distribution assembly, the assembly comprising:
    a cart comprising a base platform, at least one long support leg, at least one short support leg, at least one spool support bar disposed at a slope between the long and short support legs, the spool support bar forming a plurality of spaced-apart slots, the long support leg being longer than the short support leg;
    a bracket joining with the long support leg or the short support leg;
    at least one wheel joined to the base platform;
    multiple interchangeable conveyor rollers interchangeably fitted into any one of the slots, the conveyor rollers comprising a shaft, a plurality of antifriction ball bearings, an outer cylinder race, and a spring disposed between the outer cylinder race and the shaft, whereby the conveyor rollers rotate freely in the slots; and
    multiple spools concentrically rotatable about the conveyor rollers, whereby the spools are disposed at a slope along the length of the cart, the spools being operable to enable carrying a plurality of cables, whereby the spools draw and spool the cables.

15. The assembly of claim 14, wherein the cart comprises a handle bar extending between the long leg supports.

16. The assembly of claim 14, wherein the cart comprises at least one lateral support bar, the lateral support bar connecting the short support legs.

17. The assembly of claim 16, wherein the spring enables spring returned mounting for facilitated access to the ball bearings.

18. A mobile electrical cable distribution assembly, the assembly consisting of:
    a cart comprising a base platform, at least one long support leg, at least one short support leg, at least one spool support bar disposed at a slope between the long and short support legs, the spool support bar forming a plurality of spaced-apart slots, the long support leg being longer than the short support leg;
    at least one lateral support bar, the lateral support bar connecting the short support legs;
    a handle bar extending between the long leg supports;
    at least one wheel joined to the base platform;
    multiple interchangeable conveyor rollers interchangeably fitted into any one of the slots, the conveyor rollers comprising a shaft, a plurality of antifriction ball bearings, and an outer cylinder race, whereby the conveyor rollers rotate freely in the slots;
    a bracket joining with the long support leg or the short support leg, the bracket retaining at least one of the conveyor rollers;
    a spring disposed between the outer cylinder race and the shaft, the spring enabling spring returned mounting for facilitated access to the ball bearings; and
    multiple spools concentrically rotatable about the conveyor rollers, whereby the spools are disposed at a slope along the length of the cart, the spools being operable to enable carrying a plurality of cables, whereby the spools draw and spool the cables.

* * * * *